(12) United States Patent
Stehr

(10) Patent No.: US 11,370,106 B2
(45) Date of Patent: Jun. 28, 2022

(54) PALLET ROBOT WITH SCISSOR LIFT

(71) Applicant: DÜCKER GROUP GMBH, Langenfeld (DE)

(72) Inventor: Roland Stehr, Langenfeld (DE)

(73) Assignee: DUECKER GROUP GMBH, Langenfeld (DE)

( * ) Notice: Subject to any disclaimer, the term of this patent is extended or adjusted under 35 U.S.C. 154(b) by 302 days.

(21) Appl. No.: 16/618,465

(22) PCT Filed: Jun. 4, 2018

(86) PCT No.: PCT/EP2018/064625
§ 371 (c)(1),
(2) Date: Dec. 2, 2019

(87) PCT Pub. No.: WO2018/220229
PCT Pub. Date: Dec. 6, 2018

(65) Prior Publication Data
US 2021/0138629 A1 May 13, 2021

(30) Foreign Application Priority Data
Jun. 2, 2017 (DE) .......................... 10207112240.0

(51) Int. Cl.
| | |
|---|---|
| B25J 5/00 | (2006.01) |
| B25J 15/06 | (2006.01) |
| B25J 19/00 | (2006.01) |
| B66C 1/02 | (2006.01) |
| B66F 7/06 | (2006.01) |

(52) U.S. Cl.
CPC ............. *B25J 5/00* (2013.01); *B25J 15/0616* (2013.01); *B25J 19/0029* (2013.01); *B66C 1/0243* (2013.01); *B66F 7/0666* (2013.01)

(58) Field of Classification Search
CPC ...... B25J 5/00; B25J 15/0616; B25J 15/0253; B25J 19/0029; B25J 9/026; B66C 1/0243; B66C 7/02; B66C 11/06; B66F 7/0666; B66F 7/0616; B65G 47/901; B65G 47/912
See application file for complete search history.

(56) References Cited

U.S. PATENT DOCUMENTS

| | | | |
|---|---|---|---|
| 3,021,963 A * | 2/1962 | Kasdorf | .................. B66C 13/06 212/319 |
| 4,732,224 A * | 3/1988 | Deeter | .................... E21C 25/58 175/85 |

(Continued)

FOREIGN PATENT DOCUMENTS

| | | | |
|---|---|---|---|
| FR | 2627761 A | 9/1898 | |
| WO | WO-2006112857 A2 * | 10/2006 | ................ B66F 7/08 |

*Primary Examiner* — Stephen A Vu
(74) *Attorney, Agent, or Firm* — Andrew Wilford

(57) ABSTRACT

The invention relates to a handling device (1), having a drive carriage (2) that is movable relative to a carrier (3), wherein a scissor lift (7) having a plurality of scissor-lift members (8) is arranged with its first end on the drive carriage (2), wherein a carrier plate (11) that is movable relative to the drive carriage (2) by means of the scissor lift (7) is arranged at the second end of the scissor lift (7), wherein: a gripping tool is arranged on the carrier plate (11), the scissor-lift members (8) are hollow throughout and are sealingly interconnected in order to actuate the gripping tool by means of a gaseous medium.

5 Claims, 3 Drawing Sheets

(56) References Cited

U.S. PATENT DOCUMENTS

| | | | |
|---|---|---|---|
| 2004/0182381 A1* | 9/2004 | Yeh | A47J 37/0763 |
| | | | 126/25 R |
| 2005/0079041 A1 | 4/2005 | Campb Ell | |
| 2010/0307999 A1 | 12/2010 | Franz | |
| 2020/0317488 A1* | 10/2020 | Bafile | B66F 11/044 |
| 2020/0317494 A1* | 10/2020 | Bafile | F16D 55/02 |

* cited by examiner

Fig. 1
Fig. 2
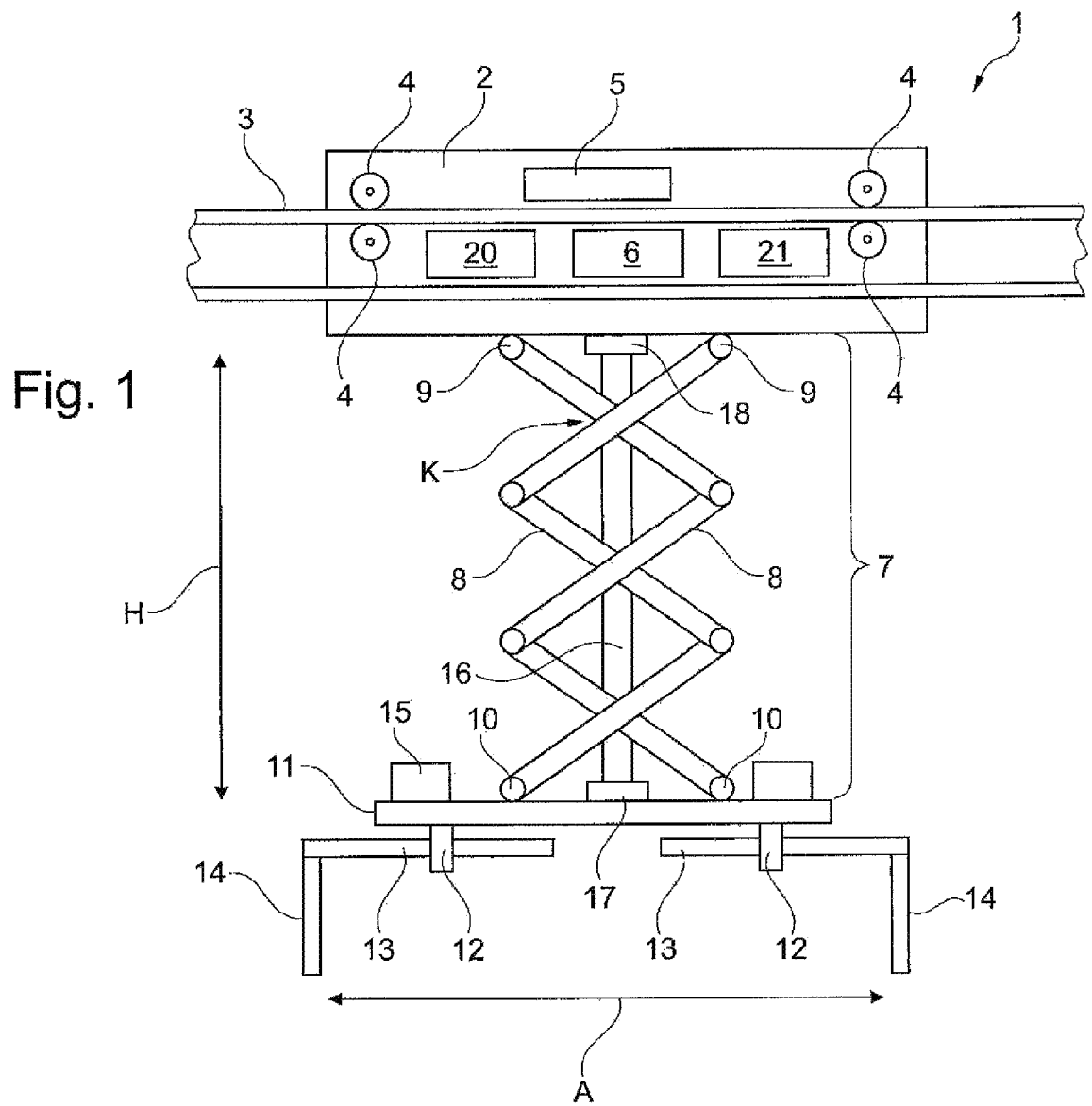
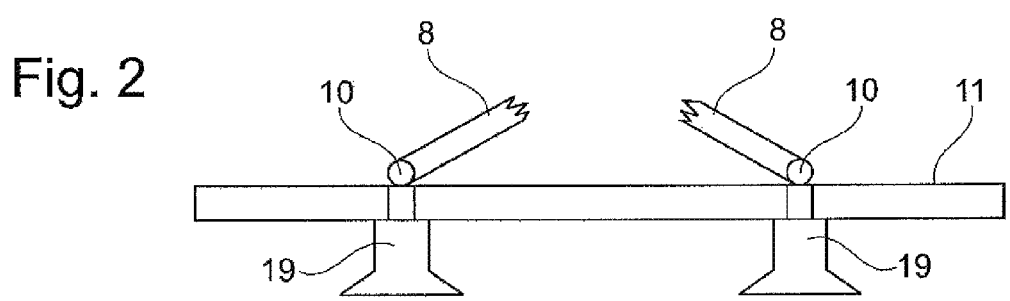

PALLET ROBOT WITH SCISSOR LIFT

CROSS REFERENCE TO RELATED APPLICATIONS

This application is the US-national stage of PCT application PCT/EP2018/064625 filed 4 Jun. 2018 and claiming the priority of German patent application 102017112240.0 itself filed 2 Jun. 2017.

FIELD OF THE INVENTION

The invention relates to a manipulator having a carriage movable along a beam, a scissor lift mechanism having one end on the carriage, and a grab on the other end of the scissor lift mechanism.

BACKGROUND OF THE INVENTION

As manipulators, pallet robots are known that are used for moving objects. Objects are for example flat structures such as cardboards, wooden boards and the like. Other objects such as for example Euro pallets, boxes and the like can however also be transferred by a pallet robot of this type.

To move an object, the pallet robot has a grab that is vertically movable on an also movable beam. It is known, for movement of the grab, for a T-shaped beam to be for example mounted on a ceiling of a machine hall or else on a mounting stand, on which beam there is in turn a trolley. For this purpose, open designs are known, such that the known trolleys very quickly accumulate dirt, permit only straight-line travel, and are of cumbersome and voluminous construction.

OBJECT OF THE INVENTION

The object of the invention is to improve a known manipulator with regard to its operation.

SUMMARY OF THE INVENTION

According to the invention, a manipulator is provided having a carriage movable relative to a beam, a scissor lift mechanism that has multiple scissor members and a first end on the carriage and a second end on a support plate movable relative to the carriage by the scissor lift mechanism, a grab on the support plate, the scissor members being of a continuously hollow design and sealingly connected to one another in order to actuate the grab by a gaseous medium.

The manipulator moves along the beam to at its intended location, and the beam is for example fastened on the ceiling of a factory hall using suitable means. It is alternatively conceivable for the beam to be preferably mounted on stands on the floor of a factory hall. A linear back-and-forth movement can be performed by the carriage, while a horizontal upward and downward movement is performed by a scissor lift mechanism known per se. The gripping of objects is performed by the grab that is designed and suitable for picking up objects that are in a first position, moving them vertically and horizontally and setting them down in another position different from the first position.

For actuating the grab, according to the invention the scissor members of the scissor lift mechanism are of a continuously hollow design and are sealingly connected to one another, in order to actuate the grab by a gaseous medium. The grab or its grab elements are no longer actuated by electrical drives, but a device for generating the gaseous medium is provided, and the gaseous medium provided is transmitted via the hollow scissor members from the carriage, in which the generating device is located, up to the grab or to the corresponding grab elements thereof. This advantageously obviates the need for additional transmission means, such as for example compressed-air hoses. The scissor lift mechanism consequently performs two functions, to be specific on the one hand the actual upward and downward movement of the objects to be handled and the transmission of the gaseous medium that actuates the grab elements of the grab. It goes without saying here that a sealing connection between the device for generating the gaseous medium and the grab or the grab elements is realized in order to prevent escape of the medium. In particular, the fastening points and points of articulation of the scissor members concerned on the carriage and on the grab and also the points of articulation of the scissor members by means of which they are connected to one another are designed such that the function (in particular pivoting at a predeterminable angle) and at the same time the sealed transmission of the medium are ensured. At the same time, the hollow scissor members form a storage reservoir for the gaseous medium.

In a refinement of the invention, the gaseous medium is compressed air and a device for generating compressed air is on the carriage. The device for generating compressed air is consequently moved along with the carriage when it moves. The generated compressed air is transmitted to the grab via the hollow scissor members. At the same time, the hollow scissor members form a storage reservoir for the compressed air. This transmitted compressed air can actuate the grab itself (for example to be rotated about the vertical axis of the manipulator) and/or the grab elements of the grab can be moved for picking up and setting down the object. In these two cases, there is no need for a known drive of the grab and/or the grab elements in the form of an electric motor. It is of course possible that, for example, the grab is operated as before with an electric motor, whereas the grab elements are operated by the compressed air (or vice versa).

In a refinement of the invention, it is provided that the gaseous medium is a vacuum and a device for generating a vacuum is on the carriage. Also in this case, the scissor members are of a hollow design and serve for transmitting or storing the vacuum. As also already in the case of the embodiment by compressed air, the drive by a vacuum may replace electrical drives for the grab and/or the grab elements.

Irrespective of whether the gaseous medium is compressed air or a vacuum, there are corresponding control means (actuators such as valves or the like) that are activated by a corresponding controller, in order in particular to actuate the grab and/or the grab elements thereof. The scissor lift mechanism itself is preferably not actuated by a gaseous medium, but instead electrically operated drive means (such as for example an electric motor that drives a toothed belt) are correspondingly provided for this purpose. It may however nonetheless be contemplated to use a drive motor operated with compressed air instead of an electric motor that drives a toothed belt.

In a refinement of the invention, at least one vacuum-operable suction cup is on the support plate of the grab. By such known and controllable suction cups, preferably sheet-like objects (such as for example stacks of paper, cardboard or the like) can be attached by suction and handled one at a time.

In a refinement of the invention, at least one electric cable is laid inside some of the scissor members of the scissor lift mechanism. The scissor lift mechanism consists in a way known per se of two sets, and one set in each case is made up of multiple scissor members that are connected to one another in an articulated and sealing manner throughout. For the transmission for example of energy from the carriage to a drive motor of the grab or for the transmission of signals for example from the carriage to actuators and/or sensors of the grab, an electric cable is laid from the carriage through the hollow scissor members. In this way, the electric cable is protected from external influences, in particular from mechanical damage, and the overall appearance of the manipulator is improved. Transmitting or storing the gaseous medium inside the scissor members is not impaired by this.

In a refinement of the invention, the connection of the scissor members by means of which the scissor lift mechanism is connected to the support plate of the grab is designed as a releasable fastening point. The releasable fastening point consequently forms an interface via that the associated ends of the scissor members are connected to the support plate of the grab. Such an interface allows a rapid change of the grab to take place if it is to be exchanged, for example because of a defect or change of its dimensions. Furthermore, such an interface can be standardized with regard to the electrical and/or pneumatic connection between the scissor lift mechanism and the grab.

BRIEF DESCRIPTION OF THE DRAWING

A manipulator (also referred to as a pallet robot) according to the invention will be described below with reference to an embodiment. The manipulator shown not only represents an embodiment according to the invention but also further essential features of the manipulator that, individually or in combination with one another, contribute to effective operation of this device. In the drawing:

FIG. 1 is a detailed overview illustration of a manipulator;

FIG. 2 is a detail view of an alternative grab for the manipulator;

SPECIFIC DESCRIPTION OF THE INVENTION

Figure 3:
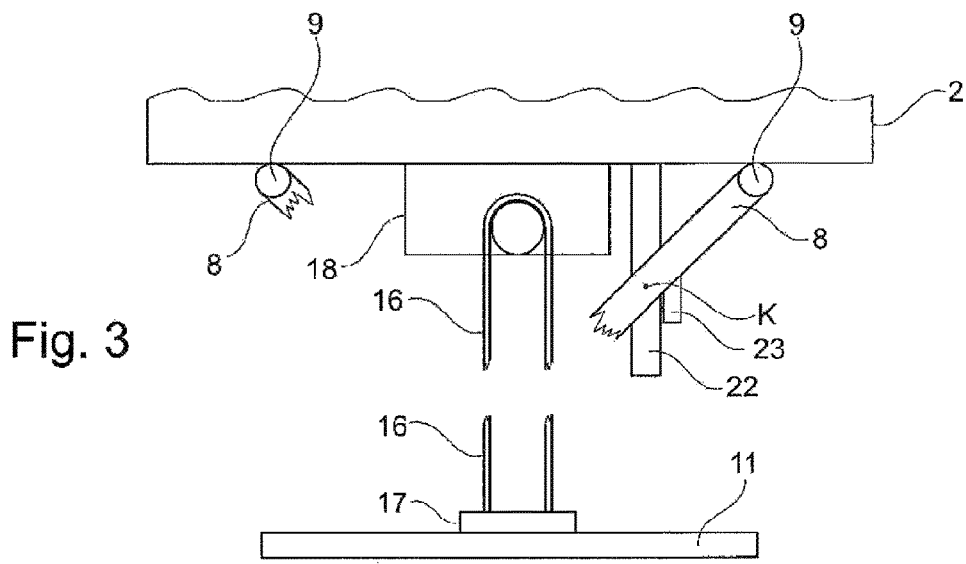
FIG. 3 shows an adjusting element for the inventive manipulator.

This manipulator 1 comprises multiple components with their individual elements that will be described in detail below.

One component is a beam with a carriage that is present in the upper part of the manipulator 1.

A further component is a grab for handling objects such as, for example, flat structures such as cardboards, wooden boards, Euro pallets and the like. This grab can be seen in the lower part of FIG. 1.

A further component is a scissor lift mechanism that connects the upper part of the manipulator 1 to the grab.

These individual components of the manipulator 1 will be described in detail below.

As can be seen in FIG. 1, the manipulator 1 has a carriage 2, relative to a stationary longitudinal beam 3. At least one drive wheel 4 of the carriage 2 is driven by a drive motor 5, and the at least one drive wheel 4 and the drive motor 5 are in the carriage 2. Schematically illustrated is a controller 6 that receives control signals for the purposes of operating the individual components of the manipulator 1. The control signals are transmitted in wired and/or wireless fashion to the controller 6. It is likewise conceivable for signals to be transmitted (or also received) from the controller 6 to an external control and/or monitoring device that is independent of the manipulator 1 and that can also transmit the control signals to the controller 6.

The longitudinal beam 3 is stationary. It is installed for example under the ceiling of a building, in particular of a factory hall. It is alternatively conceivable for this longitudinal beam to be mounted on stands at at least two points, in particular exactly two points. Particularly advantageous is the arrangement of exactly two stands at the two ends of the longitudinal beam 3, because, in this way, the carriage 2 can travel along the entire intermediate region between these two points. The carriage 2 thus moves horizontally.

Below the carriage 2, for upward and downward (vertical) movement of the grabs arranged below this carriage, there is a scissor lift mechanism 7. The grab can be moved to different heights by this powered scissor lift mechanism 7. By the vertical movement of the grab and the horizontal movement of the carriage 2, objects can be picked up, moved to a different position, and set down again by the grab.

The scissor mechanism 7 is, in a manner known per se, composed of multiple scissor members 8. The ends of two scissor members 8 are secured by rsp pivots 9 to the bottom side of the carriage 2. Rsp pivots 10 mount the ends of two further scissor members 9 on a support plate 11 of the grab. The fastening points 9, 10 make it possible for the angle at which the respective scissor members 8 lie relative to the bottom side of the carriage 2 or the top side of the support plate 11, respectively, to be varied in order to thus be able to vary the height H between the grab and the carriage 2 in targeted fashion.

Arranged below the support plate 11 of the grab is at least one bearing point 12 that receives at least one guide rod 13. A grab element 14 is arranged at the end of the guide rod 13. In one specific embodiment, a total of four bearing points 12 are provided, and in each case two bearing points 12 are assigned to one guide rod 13. This means that two guide rods 13 are provided, and each of the two guide rods 13 are movable and guided in two bearing points 12. Thus, a grab element 14 is mounted at one end of each of the guide rods 13. The two oppositely situated grab elements 14 can, by a controllable drive motor 15 that acts on the guide rods 13, be varied in terms of their spacing A to one another in order to grip an object (by virtue of the spacing A being reduced) and release this object again after it has been set down (by virtue of the spacing A being increased again at least slightly).

The height H of the scissor lift mechanism 7 is varied by an adjusting element 16. The adjusting element 16 secured by a mounting block 17 to the grab. At the end opposite the mounting block 17, the adjusting element 16 is connected to a drive 18. The adjusting element 16 is for example a toothed belt that extends between the drive 18 and the mounting block 17. By actuation of the adjusting element 16 by the drive 18, the height H of the scissor lift mechanism 7 is varied, whereby the inclination angle of the individual scissor members 8 with respect to one another changes in a manner known per se.

An alternative embodiment with regard to the grab is shown in FIG. 2. FIG. 1 showed how the grab has grab elements 14 that can be moved in terms of their spacing A by the drive motor 15 in order to be able, through variation of the spacing A, to grip objects and set these down again after they have been moved to a different position by movement of the scissor lift mechanism 7 and/or movement of the carriage 2. Alternatively or in addition to these grab elements 14, the grab may in particular comprise suction cups 19 arranged on the support plate 11. This suction cups 19 together with a device 20 for generating a vacuum. The device 20 forms a subatmospheric pressure that is transmitted in a suitable manner (for example through hoses and/or through the interior of the scissor members 8) to the suction cups 19. The controller then for example operates these suction cups 19 in a controlled manner in order, by the vacuum, to pick up an object by suction. The object can thereafter be moved to a different position by the scissor lift mechanism 7 and/or movement of the carriage 2, and can be released, and thus set down, again by ending the vacuum at the suction cups 19. If the vacuum is transmitted through the interior of the scissor members 8, these are sealingly connected to one another. This means that not only the connecting points of the scissor members 8 to one another but also the fastening points 9, 10 are of correspondingly sealed design in order to transmit the vacuum. The same also applies to the connection of the upper ends of the scissor members 8 that are arranged on the carriage 2, to the device 20 for generating a vacuum.

Instead of movement of the grab elements 14 of the grab by an electrically operated drive motor 15, it is conceivable for the drive or movement of the grab elements 14 to be realized by compressed air. For this purpose, a device 21 for generating compressed air is provided in the carriage 2. In this case, too, the compressed air generated by the device 21 can be transmitted via compressed-air hoses to the grab elements 14. It is likewise conceivable for the compressed air to be transmitted from the device 21 to the grab elements 14 via the interior of the scissor members 8. In this case, too, the connecting points of the scissor members 8 to one another and the fastening points 9, 10 are of sealed design in order to prevent compressed air (or a vacuum) from being able to escape at these locations where movable parts are connected to one another. The two devices 20, 21 may be provided in each case exclusively, such that the grab is operated either only with a vacuum or only with compressed air. It is also conceivable for the grab elements 14 to be operated in a manner controlled by the drive motor 15, and for the suction cups 19 to additionally be provided, such that, in this case, the device 20 for generating a vacuum is also provided in addition to the drive motor 15. In this case, the device 21 for generating compressed air can be omitted. It is furthermore conceivable for the grab elements 14 to be operated by compressed air, such that, in this case, the device 21 for generating compressed air is also provided in addition to the suction cups 19 and the device 20 for generating a vacuum. Since the scissor lift mechanism 7 comprises two sets of scissor members 8, it is conceivable for one set or both sets to be designed and used for the transmission (and storage) of compressed air or for one set or both sets to be designed and used for the transmission (and storage) of a vacuum or for one set to be designed and used for the transmission (and storage) of compressed air and for the other set to be designed and used for the transmission (and storage) of a vacuum.

FIG. 3 shows how the adjusting element 16 is a belt element, in particular a toothed belt. This adjusting element 16 is arranged between the drive 18 that is fixed to the carriage 2, and the mounting block 17 on the support plate 11 of the grab.

In order to be able to control the height H between the support plate 11 and the carriage 2 in targeted fashion and pick up an object from a first position, move this object and set this object down again at a second desired position, it is necessary to detect the value of the height H, that is to say the spacing between the carriage 2 and the support plate 11. This detection is performed by a guide rod 22 that coacts with a sensor 23. The sensor 23 is coupled to one of the scissor members 8 such that, during the extension or contraction of the scissor lift mechanism 7, the spacing of the sensor 23 from the guide rod 22 changes, and this change is detected by the sensor 23 and is a measure for the height H. The output value of the sensor 23 is transmitted in wireless or wired fashion to the controller 6 (and possibly to a further control and/or monitoring device outside the manipulator 1). The sensor 23 is coupled by suitable coupling means (not illustrated) at a coupling point K to the scissor member 8 assigned thereto. In this case, the guide rod 22 serves merely for the guided movement of the sensor 23.

Figure 4:
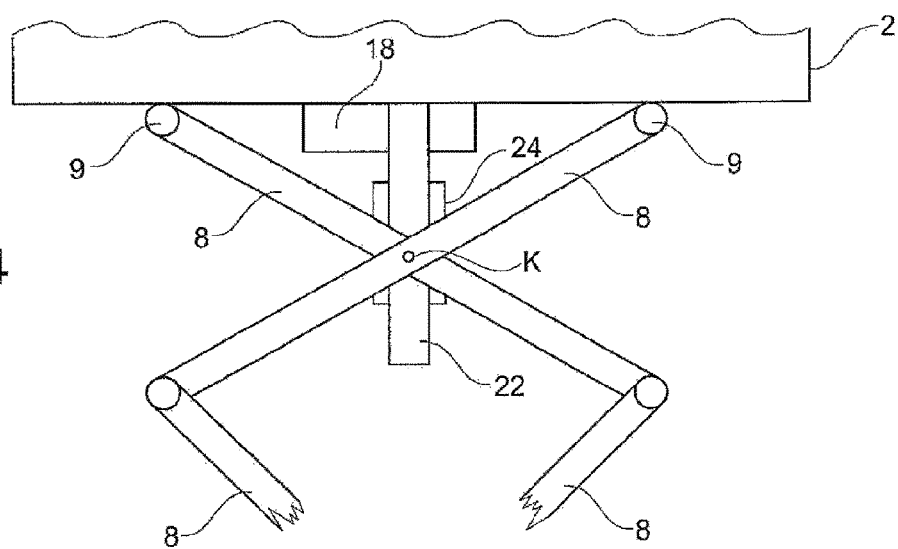
FIG. 4 shows the a coupling element of the manipulator.

It is illustrated in FIG. 4 that the guide rod 22 is not coupled to a sensor 23 but has a coupling element 24. The coupling element 24 can be moved linearly relative to the guide rod 22 when the scissor lift mechanism 7 is extended and contracted, and the height H is thus varied, by the drive 18. A coupling is thus realized at the coupling point K between the guide rod 22 and the scissor lift mechanism 7, and the coupling ensures targeted positive guidance of the scissor lift mechanism 7. The scissor lift mechanism 7 is thus prevented from being able to oscillate during its movement. In such a situation, no sensor 23 that could be used for detecting the height H is provided. If such a sensor 23 (as illustrated in FIG. 4) is not provided, the height H can be detected for example by movement of the drive 18. If the drive 18 is an electric motor, it is for example possible for a change in the height H, or the height H (in absolute terms), to be inferred from the number of rotations of this electric motor. Alternatively or in addition to this, it is conceivable for the height H, that is to say the change or present value thereof (such as for example the endpoints or points in between), to be determined by further detection means (for example a laser-based spacing measurement between the carriage 2 and the support plate 11). It is self-evidently also conceivable for the arrangement shown in FIG. 4 to be assigned a sensor 23. This sensor 23 could then for example be connected to the coupling element 24, because the latter moves relative to the guide rod 22. It is also conceivable for the coupling element 24 and the sensor 23 to be realized in a single element.

With regard to the illustration in FIG. 4, it must also be stated that this involves a particularly advantageous embodiment in which exactly two guide rods 22 are provided, and the drive 18 for the scissor lift mechanism 7 is arranged centrally between the two guide rods 22 arranged adjacent thereto. In the view in FIG. 4, it can be seen that two scissor members 8 cross one another at the coupling point K, and this coupling point K is approximately in the center, preferably exactly in the center, between the two illustrated scissor members 8. Situated behind this two scissor members 8 that form a first set of the scissor lift mechanism 7, in the view of FIG. 4, there is a first guide rod 22 (illustrated) that is equipped with the coupling element 24 relative to the guide rod 22 when the scissor lift mechanism 7 is extended and retracted. The drive 18 for the scissor lift mechanism 7 is behind this illustrated first guide rod 22. Situated behind that in turn is a second guide rod 22 (not illustrated) that also has a dedicated coupling element 24. This latter coupling element 24 (not visible in FIG. 4) is in turn coupled to further scissor members 8 (likewise not illustrated) at a further coupling point K, and this further scissor members 8 form the second set of the scissor lift mechanism 7. The above-described arrangement yields a symmetrical construction of the positive guide of the scissor lift mechanism 7 when the latter is extended and retracted. The drive 18 is for example an electric motor (not illustrated) that acts on a toothed belt that is anchored on the grab and, through changes in length, varies the height H or the position of the grab relative to the carriage 2 and likewise the position of the grab relative to the work area.

Figure 5:
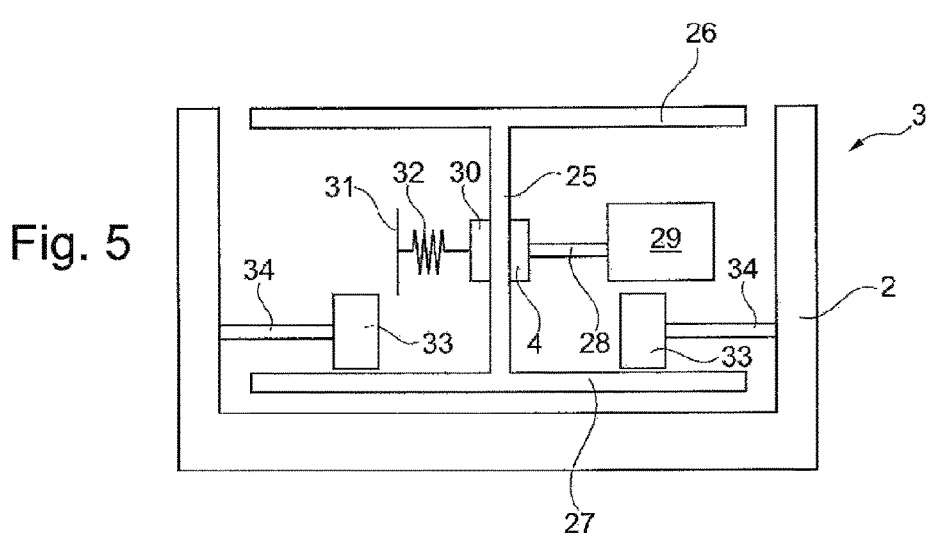
FIG. 5 shows the beam of the manipulator.
Figure 6:
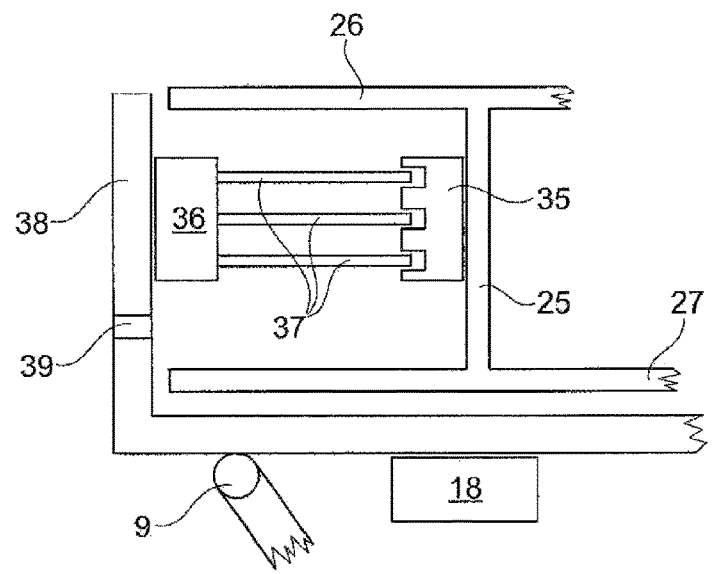
FIG. 6 shows the power supply for the manipulator.

Further detail views of the longitudinal beam 3 in interaction with the carriage 2 are illustrated in FIGS. 5 and 6.

It can be seen in FIG. 5 that the longitudinal beam 3 is designed as an H-shaped beam. This beam has a center web 25 and upper flanges 26 and lower flanges 27 that project from the two ends of the center web 25. By the upper flanges 26, the longitudinal beam 3 is fastened by suitable fasteners (not illustrated) for example to the ceiling of a factory hall. The intermediate region between the flanges 25, 26, 27 is thus available for the arrangement, or integration within this region, of in particular the drive for the carriage 2, the controller 6, possibly the devices 20, 21 and means for guiding the carriage 2 along the longitudinal beam 3 during movement thereof. It is ideally the case that no single element projects beyond the ends of the two flanges 26, 27. The integration has the advantage that a compact construction of the carriage 2 is realized.

The at least one drive wheel 4 that has already been schematically illustrated in FIG. 1 is connected by a shaft 28 to an electric motor 29 that moves the carriage 2 along the longitudinal beam 3. In the embodiment of FIG. 5, the drive wheel 4 is supported on the center web 25, preferably exactly in the center between the two flanges 26, 27. This drive wheel may also be supported on the center web 25, or on one of the two flanges 26, 27, at some other location. If the drive wheel 4 is supported at the position shown in FIG. 5, it is likewise preferably the case that a guide wheel 30 is arranged in the center of the center web 25 (again preferably exactly opposite the position of the drive wheel 4). The guide wheel 30 is supported on a base 31 of the carriage 2. This support may be either rigid or, as illustrated in FIG. 5, realized by a spring 32. The support via a spring 32 has the advantage not only that tolerances of the longitudinal beam 3 can be compensated during movement of the carriage 2 but also that movement along a curve is then also possible if the longitudinal beam 3 has a curvature in its longitudinal extent.

Depending on the design of the at least one drive wheel 4 (possibly with the aid of the at least one guide wheel 30), it is sufficient for the carriage 2 to be supported, on its movement travel, on the longitudinal beam 3. For the optimum guidance and also the best possible pick-up of objects and movement of objects that have been picked up and are to be moved by the grab, the carriage 2 has at least one supporting wheel 33 that, for example via a shaft 34, is arranged and supported on a base of the carriage 2 (for example of the side part thereof). For picking up loads, the at least one supporting wheel 33 is supported on the lower flange 27. It is of particular significance that the carriage 2 has in each case one supporting wheel 33 in each case approximately in the end region of this carriage, that is to say has a total of four supporting wheels 33. Two of the supporting wheels 33 are thus supported on the lower flange 27 on one side of the center web 25, and the two further supporting wheels 33 are supported on the other side. As an alternative to the four supporting wheels 33 as described above, use may also be made of three supporting wheels (tripod principle).

FIG. 6 illustrates how a power supply is integrated within the carriage 2 and in the interior region of the H-shaped longitudinal beam 3 between the flanges 25, 26, 27. The power supply has a power rail 35 that extends longitudinally along the beam 3 on the center web 25 thereof. On the carriage 2, there is a power distributor 36 that is connected via current collectors 37 to the power rail 35. While three current collectors 37 are illustrated in FIG. 6, it is also possible for more or fewer than three current collectors 37 to be installed. It is furthermore conceivable to utilize the power supply not only for the feed of energy for example to the drives 15 or 18 but also for the transmission of control and/or sensor signals via this power supply.

Alternatively or in addition to the power supply illustrated in FIG. 6, the carriage 2 may also comprise a cover 38 that at least partially or else completely covers the free region of the longitudinal beam 3, formed by the ends of the flanges 26, 27. Such a cover 38 has the advantage that the interior region of the longitudinal beam 3 and thus the interior region of the carriage 2 are protected against access during operation of the manipulator 1. Furthermore, disruptive dirt accumulations within this interior region are prevented by the closed cover 38. It is preferable if a part of the cover 38, or else possibly the entire cover 38 that extends over the entire height or a smaller part of the entire height of the carriage 2 and/or over the entire width or a smaller part of the entire width of the carriage 2, is pivotable in order to allow access to the interior of the carriage 2 for the purposes of installation, maintenance, cleaning and the like. For this purpose, a lateral part of the carriage 2 is connected to a hinge 39. This means that an installation flap (that could also be referred to as maintenance flap, that is to say the cover 38) is arranged movably on the carriage 2 by the at least one hinge 39.

Figure 7:
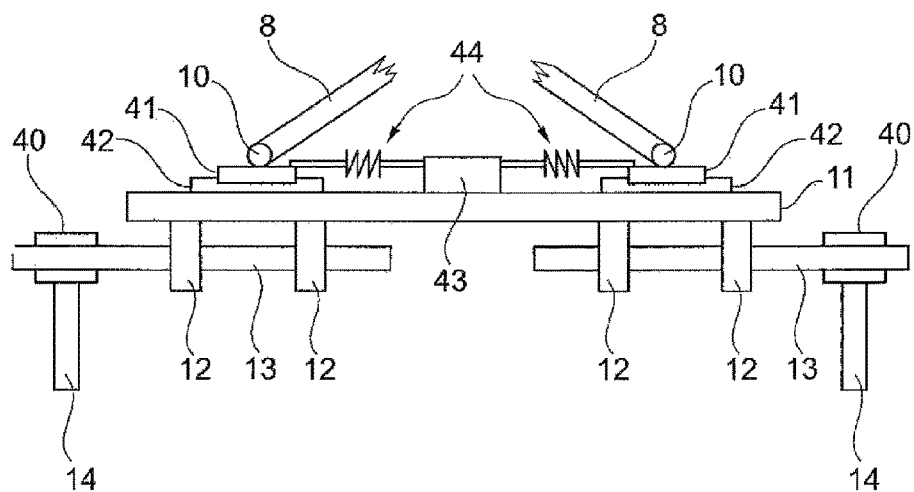
FIG. 7 shows the grab of the manipulator.

FIG. 7 shows the grab that has already been schematically illustrated in FIG. 1, with further details. This embodiment maintains the same basic principle whereby guide rods 13 are provided that are mounted on the support plate 11 and on which grab elements, in particular plate-like grab elements, are arranged. By a drive, in particular by the drive motor 15 (operated electrically or with compressed air or the like), the spacing A between the grab elements 14 is varied in controlled fashion in order to pick up the object to be handled, move it and set it down again. As can be seen in FIG. 7, the guide rods 13 are mounted in bearing points 12 on the support plate 11 and are movable relative to this support plate. According to the invention, the grab elements 14 are not fixed and anchored on the guide rods 13, in particular at the ends thereof, with the arrangement and fastening rather being realized by a coupling element 40. The coupling element 40 may for example be a screw clamp fastening of the end of the guide rod 13 to the associated part of the grab element 14. An easy exchange of the elements involved is thus possible. It is thus possible for different grab elements 14 to be used while maintaining the guide rods 13. Using the same or different grab elements 14, it is also possible for the guide rods 13 to be exchanged, such that, for example, use may be made of short, medium-length and long guide rods that are selected in a manner dependent on the dimensions of the object to be handled. Not shown, but present, are sensors that are in particular on the support plate 11. These sensors can determine the position of at least one guide rod 13, preferably of all guide rods 13, relative to the support plate 11 and transmit the position to the controller 6.

FIG. 7 also shows how the scissor lift mechanism 7 can be on the grab in order to center the grab relative to the scissor lift mechanism 7. For this purpose, the ends of the scissor members 8 are arranged with their fastening points 10 (hinge points) on a guide carriage 41. The fastening points 10 can thus vary the angle of the scissor members 8 arranged there relative to the surface of the support plate 11. This occurs when the scissor lift mechanism 7 is extended and retracted. The respective guide carriage 41 can slide on a guide rail 42 and is thus operatively connected, variably in terms of position, to the guide carriage 41. By this connection of the scissor lift mechanism 7 to the support plate 11, the relative position between this two elements can be varied. During operation of the manipulator 1, it is important for the support plate 11 and thus the grab as a whole to always be aligned in a centered manner (in the sense of a defined position) relative to the carriage 2 and/or relative to the scissor lift mechanism 7. This centering is not always realized, for example as a result of impacts during picking up the object. In order to realize centering, in particular self-centering, the scissor lift mechanism 7 can be aligned relative to the grab by the operative connection of the guide carriage 41 to the guide rail 42. To realize self-centering, compensating means 44 are arranged on a base 43 of the support plate 11, and, with the compensating means 44, it is achieved that, if the scissor lift mechanism 7 is no longer aligned centrally relative to the grab, a return into the centrally aligned position is ensured. This compensating means 44 may for example be springs. It is also conceivable for the compensating means 44 not to be on the base 43 of the support plate 11, but for the compensating means 44 (for example in the form of a cable pull) to be arranged and fastened on the two opposite guide carriages 41 and to be diverted over at least two, preferably three, diverting rollers that are arranged and fastened on the support plate 11. This arrangement and fastening and the diversion of the compensating means 44 in particular in the form of a cable pull have the effect that, for example owing to impacts, the grab can be moved out of the central alignment relative to the scissor lift mechanism 7, and self-centering subsequently occurs again, after the external action is withdrawn, owing to the diversion of the compensating means 44.

FIGS. 1 and 7 show how the support plate 11 is designed as a single-piece flat structure. It is alternatively conceivable for the support plate 11 to be of sandwich-type construction. This means that two flat structures (of similar design and/or dimension or mutually different design and/or dimension) are provided that are rotatable relative to one another about a central pivot point. It is thus possible for the first support plate, pointing in the direction of the scissor lift mechanism 7, to be arranged and fastened on the scissor lift mechanism 7, whereas the guide rods with the grab elements and the associated mounting thereof are situated on the second support plate that is aligned flatly and parallel to this first support plate. In this way, the grab elements can be rotated about the vertical axis of the manipulator 1. This rotation may be performed in a controlled manner in stepped (for example by 90°) or continuously variable fashion. An adaptation of the position of the grab elements 14 relative to the object that is to be picked up is thus possible. The detection of the position of the object that is to be picked up may be performed for example by suitable image capture means.

Figure 8:
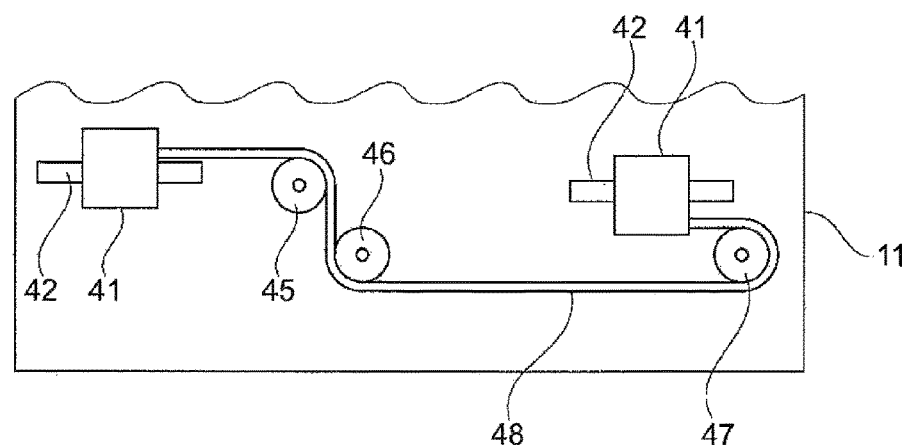
FIG. 8 shows how the grab of the manipulator is centered.

FIG. 8 shows a particularly preferred embodiment of the centering of the grab relative to the central vertical axis of the scissor lift mechanism 7 or of the carriage 2. The respective scissor members 8 are again arranged on in each case one guide carriage 41. In each case one guide carriage 41 is assigned one guide rail 42 fastened on the support plate 11, and is operatively connected to this guide rail. In this way, as has also already been described with regard to FIG. 7, a linear guided back-and-forth movement of the grab relative to the scissor lift mechanism 7 is possible. To permit this movement and simultaneously center the grab, diverting rollers 45, 46 and 47 are installed, in the arrangement shown, on the support plate 11. One end of a cable pull 48 is fastened to one end of the guide carriage 41 of one set of the scissor lift mechanism 7, and the other end is fastened to the opposite guide carriage 41 of the same set of the scissor lift mechanism 7. Owing to this mutually offset arrangement of the diverting rollers 45, 46 and 47 and the corresponding offset and the resulting guidance of the cable pull 48, a guided linear back-and-forth movement of the grab is primarily permitted, but this also ensures that, when a deflection out of the centered central position has occurred (for example owing to the action of an external impact), the grab returns into its central position again relative to the vertical axis of the manipulator 1. Alternatively or in addition to this, the arrangement of the diverting rollers 45, 46 and 47 and of the cable pull 48 as shown in FIG. 8 may also be on the other side of the scissor lift mechanism 7, that is to say at the opposite set of the scissor lift mechanism 7. Instead of this arrangement shown in FIG. 8, use may also be made of an arrangement composed of only two diverting rollers, and one diverting roller is on the support plate 11 approximately in the region between two guide carriages of a set of the scissor lift mechanism 11 and effects an offset of the cable pull. In the end region of a guide carriage, on the support plate 11, there is provided a further diverting roller that realizes a diversion of the cable pull through approximately or exactly 180°. The latter arrangement is preferably realized in the case of one set of the scissor lift mechanism 7, and the arrangement shown in FIG. 8 is then provided in the case of the other set of the scissor lift mechanism 7.

The invention will be described briefly once again in other words below:

For the actuation of the grab for the handling of objects, this grab is on a scissor lift mechanism on a carriage (trolley) on a beam. A vertical mobility of the grab is possible via the scissor lift mechanisms.

The use of compressed air has been found to be well suited for the vertical mobility or the actuation of the grab elements of the grab. For this purpose, it is necessary to transmit the compressed air from a compressed-air source to the drive elements via compressed-air lines. However, controlling the compressed air is extremely difficult and the corresponding construction of the compressed-air system is very complex, if the actuation of the actuators by compressed air is intended to be carried out with great precision. This is often required, however, if sensitive objects such as for example cardboard, wooden boards or the like are to be handled.

According to the invention, it is provided that the respective members of the scissor lift mechanism are mechanically and structurally connected to one another in a known way by pivot points, in order to ensure the known and required function of the scissor lift mechanism. At the same time, however, the interior region of the individual elements of the scissor members is designed for the transmission of compressed air. In particular, the individual scissor members are also designed for the transmission of compressed air at the points where they are connected to one another in a relatively movable manner. As a result, a very simple structure is obtained, since the individual scissor members can be used for the transmission of compressed air and there is no need for the use of additional compressed-air hoses. If appropriate, electrical lines may also be laid in the interior region of the scissor members.

| List of reference numbers | |
|---|---|
| 1. | Manipulator |
| 2. | Carriage |
| 3. | Longitudinal beam |
| 4. | Drive wheel |
| 5. | Drive motor |
| 6. | Controller |
| 7. | Scissor lift mechanism |
| 8. | Scissor member |
| 9. | Fastening point |
| 10. | Fastening point |
| 11. | Support plate |
| 12. | Bearing point |
| 13. | Guide rod |
| 14. | Grab element |
| 15. | Drive motor |
| 16. | Adjusting element |
| 17. | Attachment point |
| 18. | Drive |
| 19. | Suction cup |
| 20. | Device for generating a vacuum |
| 21. | Device for generating compressed air |
| 22. | Guide rod |
| 23. | Sensor |
| 24. | Coupling element |
| 25. | Center web |
| 26. | Upper flange |
| 27. | Lower flange |
| 28. | Shaft |
| 29. | Electric motor |
| 30. | Guide wheel |
| 31. | Base |
| 32. | Spring |
| 33. | Supporting wheel |
| 34. | Shaft |
| 35. | Power rail |
| 36. | Power distributor |
| 37. | Current collector |
| 38. | Cover |
| 39. | Hinge |
| 40. | Coupling element |
| 41. | Guide carriage |
| 42. | Guide rail |
| 43. | Base |
| 44. | Compensating means |
| 45. | Diverting roller |
| 46. | Diverting roller |
| 47. | Diverting roller |
| 48. | Cable pull |

The invention claimed is:

1. A manipulator comprising:
a carriage movable along a beam,
a support plate movable relative to the carriage;
a grab on the support plate;
a scissor lift mechanism that has multiple scissor members and a first end on the carriage and a second end on the support plate, the scissor members being of a continuously hollow design and sealingly connected to one another in order to actuate the grab by a gaseous medium; and
a compressor on the carriage for compressing air as the gaseous medium and feeding the compressed air through the hollow scissor members to the grab.

2. A manipulator comprising:
a carriage movable along a beam,
a support plate movable relative to the carriage;
a grab on the support plate; and
a scissor lift mechanism that has multiple scissor members and a first end on the carriage and a second end on the support plate, the scissor members being of a continuously hollow design and sealingly connected to one another in order to actuate the grab by a gaseous medium; and
means on the carriage for creating in the gaseous medium a subatmospheric pressure.

3. The manipulator according to claim 2, further comprising:
at least one vacuum-operable suction cup on the support plate.

4. A manipulator comprising:
a carriage movable along a beam,
a support plate movable relative to the carriage;
a grab on the support plate; and
a scissor lift mechanism that has multiple scissor members and a first end on the carriage and a second end on the support plate, the scissor members being of a continuously hollow design and sealingly connected to one another in order to actuate the grab by a gaseous medium; and
at least one electric cable inside some of the scissor members of the scissor lift mechanism.

5. A manipulator comprising:
a carriage movable along a beam,
a support plate movable relative to the carriage;
a grab on the support plate;
a scissor lift mechanism that has multiple scissor members and a first end on the carriage and a second end on the support plate, the scissor members being of a continuously hollow design and sealingly connected to one another in order to actuate the grab by a gaseous medium; and
a releasable connection between one of the scissor members and the support plate.

* * * * *